United States Patent

Bakker

[11] Patent Number: 5,840,183
[45] Date of Patent: Nov. 24, 1998

[54] APPARATUS FOR THE SEPARATION OF MATERIALS, ESPECIALLY FOR THE SEPARATION OF OIL AND OTHER SUBSTANCES FROM WATER

[75] Inventor: Johannes Hermannes Bakker, Alemere, Netherlands

[73] Assignee: International Business Development Inc., Tulsa, Okla.

[21] Appl. No.: 787,097

[22] Filed: Jan. 22, 1997

[30] Foreign Application Priority Data

Jan. 23, 1996 [NL] Netherlands ............................ 1002158

[51] Int. Cl.[6] ........................................................ C02F 9/00
[52] U.S. Cl. ...................... 210/221.2; 210/221.1; 210/256; 210/259; 210/262; 210/294; 210/522
[58] Field of Search .................................. 210/221.2, 256, 210/259, 262, 260, 294, 320, 521, 522, 806, 221.1

[56] References Cited

U.S. PATENT DOCUMENTS

| | | |
|---|---|---|
| 3,733,272 | 5/1973 | Burns . |
| 3,820,659 | 6/1974 | Parlette . |
| 3,986,954 | 10/1976 | George . |
| 4,983,287 | 1/1991 | Arnold . |
| 5,064,531 | 11/1991 | Wang . |
| 5,069,783 | 12/1991 | Wang . |
| 5,300,222 | 4/1994 | Broussard . |
| 5,320,750 | 6/1994 | Krofta . |
| 5,382,369 | 1/1995 | Vion ........................................ 210/726 |

FOREIGN PATENT DOCUMENTS

| | | |
|---|---|---|
| 0 524 039 | 1/1993 | European Pat. Off. . |
| 36 33 545 | 4/1988 | Germany . |
| 2 093 443 | 9/1982 | United Kingdom . |
| 2 166 967 | 5/1986 | United Kingdom . |

*Primary Examiner*—Thomas M. Lithgow
*Attorney, Agent, or Firm*—Foley & Lardner

[57] ABSTRACT

An apparatus for the separation of oil and other substances from a liquid such as water consisting of a first, vertical and mainly cylindrical reservoir in which separation takes place by means of gravity, a second reservoir for additional separation, and a third reservoir in which separation takes place by means of flotation such as inducing gas. The second reservoir is coated round the first reservoir over a part of the cylinder, with the third reservoir above the second reservoir and also around the first reservoir. In the wall between the first and the second reservoir, interconnecting tubes are located. The second and the third reservoir are connected with each other via an opening in a ceiling plate.

4 Claims, 2 Drawing Sheets

APPARATUS FOR THE SEPARATION OF MATERIALS, ESPECIALLY FOR THE SEPARATION OF OIL AND OTHER SUBSTANCES FROM WATER

FIELD OF THE INVENTION

The invention concerns an apparatus for the separation of a number of phases from a liquid, especially for the separation of oil and or suspended matter from water, which apparatus consists in the first place of a vertical and mainly cylindrical reservoir where primary separation slakes place by means of gravity, plus a second reservoir in which additional separation takes place and a third reservoir where separation takes place by means of flotation such as for instance inducing air into the liquid.

BACKGROUND OF THE INVENTION

With other known equipment of the same type, the reservoirs are erected separately from each other and the liquid to be treated is transported by means of pumping and via pipelines from one reservoir to the other. Oil and suspended matter can be separated from the water. The above mentioned additional separation can take place by plate separators or other types of equipment, placed in the reservoir. With this type of separation, even very small oil drops can be separated from the water. The above described systems, consisting of a number of separately erected reservoirs require a lot of space and in between each reservoir pipelines must extend some cases pumps are required. In many cases valves are also required to prevent leakage in the case of a damaged pipeline.

SUMMARY OF THE INVENTION

The object of the invention is to improve this type of equipment in such a way that less floorspace and maintenance will be required. Other objects of the invention are to provide of the equipment at lower cost and to increase the ease of operation.

The invention offers all of the above advantages because the second reservoir is mounted around the first reservoir over a limited part of the height. On top of the second reservoir and as well around the first reservoir, the third reservoir is mounted.

By placing the third reservoir on top of the second reservoir, it is clear that a lot of floorspace will be required. Also the required amount of material for the system is reduced because certain walls between the reservoirs are the same. Also less piping and valves are required which makes the system easier to be operated and less maintenance will be required as well.

The first reservoir can be internally connected to the second reservoir with a number of internal tubes located at a certain distance from the bottom of the first reservoir with a number of separators, for instance plate separators, mounted in the second reservoir. By selecting a number of connecting tubes, the flow rate of the liquid from the first reservoir to the second reservoir can be determined.

For each connecting tube between the two compartments, a plate separator can be placed where an optimum separation efficiency of each plate separator can be obtained.

The connecting pipes can be mounted tangential to the wall between the first and the second reservoir. In this way, the direction of the flow of the fluid in the second reservoir towards the plate separators can be determined.

BRIEF DESCRIPTION OF THE DRAWING

The invention is explained in detail in the drawings, showing an example of the system in which.

DETAILED DESCRIPTION OF THE PREFERRED EMBODIMENT

Figure 1:
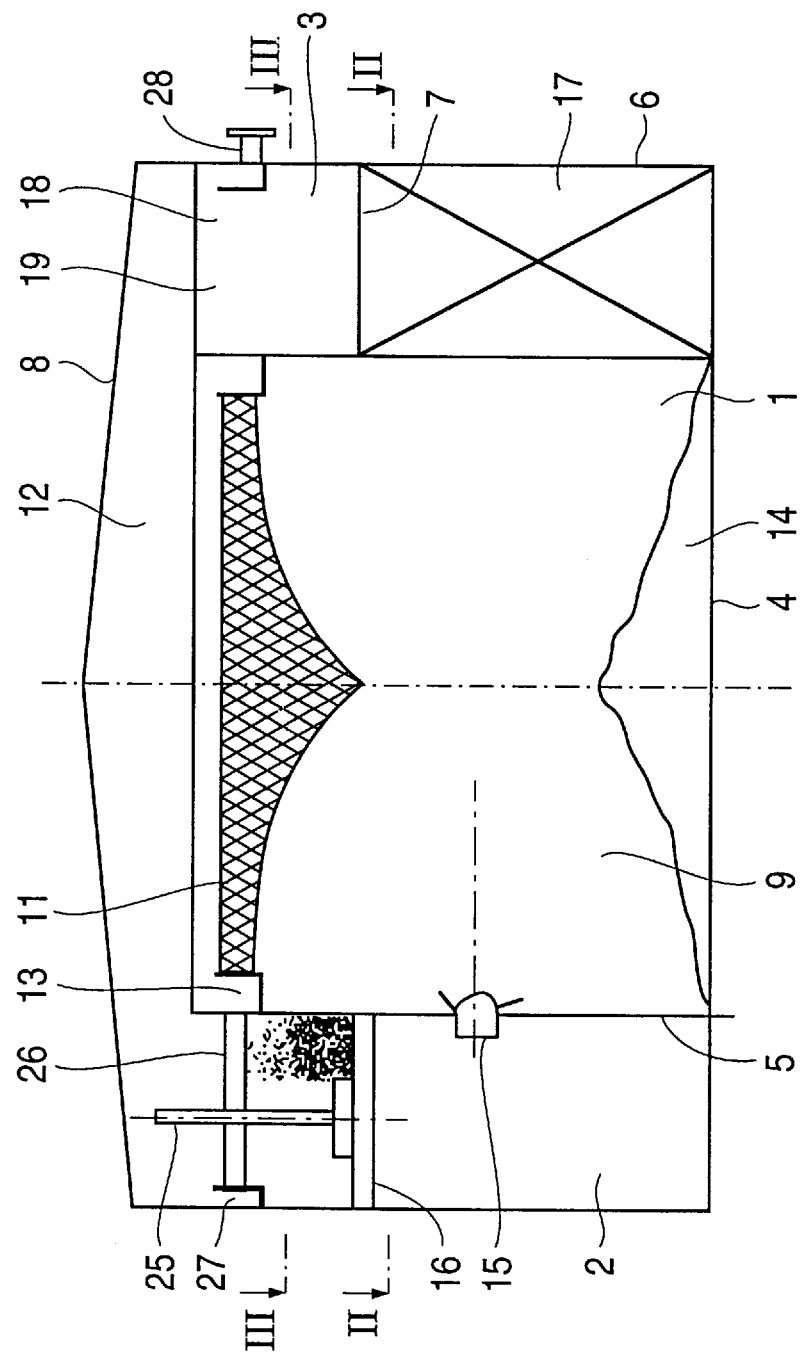
FIG. 1 is a vertical cross section showing the system according to the invention.
Figure 3:
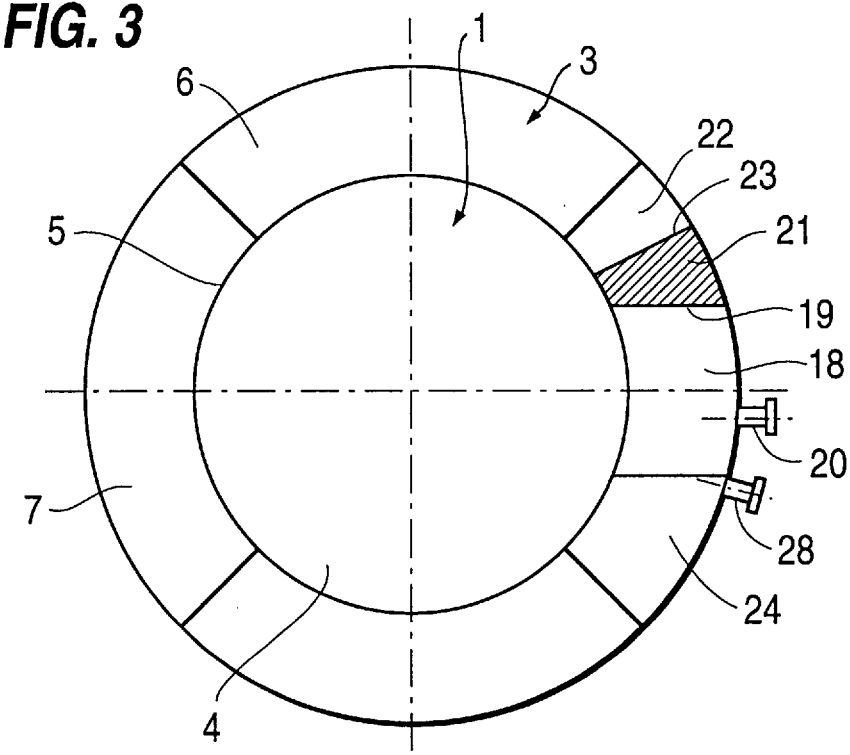
FIGS. 2 and 3 are horizontal cross sections of the apparatus showing the invention according to the lines II—II and III—III, respectively, in FIG. 1.

The apparatus shown consists of a first reservoir 1, a second reservoir 2 and a third reservoir 3. The first reservoir 1 consists of a bottom plate 4 and a cylindrical wall 5. The second reservoir 2 consists of the bottom plate 4, the cylindrical wall 5, a cylindrical wall 6 and an intermediate cover 7. The third reservoir consists of the walls 5,6 and 7 and, connected to the wall 6, over the total reservoir, a top cover 8.

Figure 2:
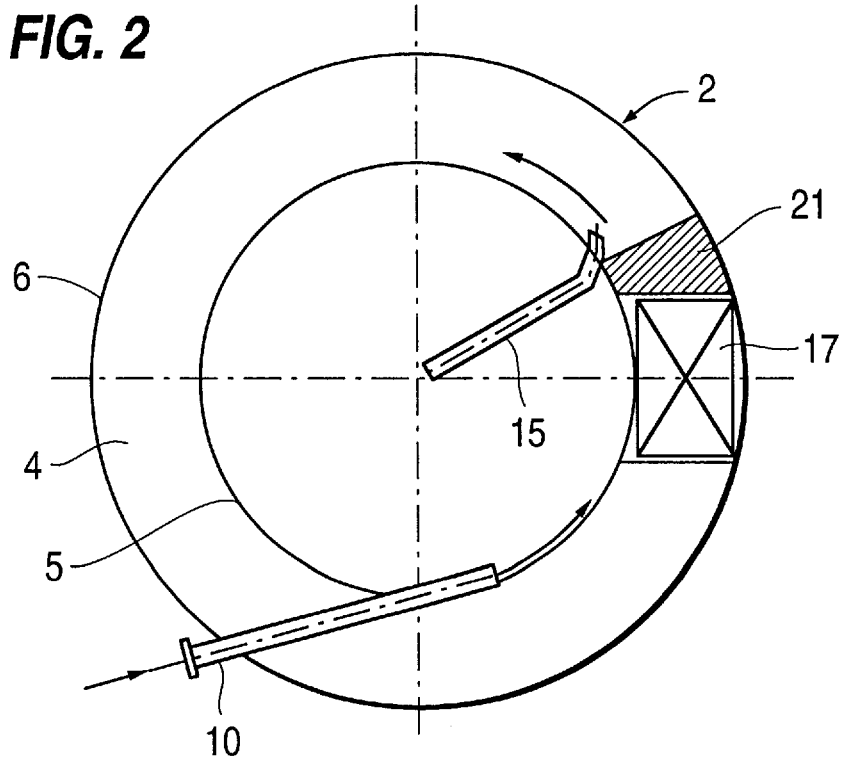

The liquid to be treated 9, for instance water, enters reservoir 1 via a tangentially placed inlet pipe 10 (tangential to cylindrical wall 5, see FIG. 2). In the first reservoir 1, the lighter and the heavier phases will be separated from the liquid phase, by means of gravity. The tangential inlet can create a rotating flow pattern and consequently a better separation effect. The separating efficiency can be improved if a, not further to be described, pump will be installed, recirculating a certain quantity of water. Further, more air can be introduced into the liquid entering the system.

For instance, oil 11 will rise to the surface and can be removed in a known way and gasses will collect under the top cover. The oil can be evacuated from the system by increasing the level in the first reservoir 1, forcing oil to flow to the gutter 13 and to be removed from the gutter 13 in a manner not shown.

The heavy material 14 will settle and collect at the bottom, from where it is evacuated from the system in a manner not further described.

In the wall 5, an outlet tube 15 is mounted to allow the liquid to flow from the first reservoir 1 to the second reservoir 2. The tube 15 can be mounted tangentially (to the cylindrical wall 5) in order to force the liquid in a certain direction. More than one tube 15 may be utilized. In the second reservoir 2, further oil present in the water will be removed and will form an oil layer 16 under the immediate cover. Further, it is possible to place one or more plate separators 17 in the second reservoir 2. The oil separated from the liquid by these plate separators 17 is collected in compartment 18, created by a wall 19 and the immediate cover 7. Also, the oil layer 16 will be collected in compartment 18. The oil can be evacuated from compartment 18 in a manner not further described. Because the operation of a plate separator is generally known, no further description of the operation is given.

Furthermore, additional solids can be separated by sedimentation in the second reservoir 2, and evacuated from the second reservoir 2 via outlet 20.

From the second reservoir 2, the liquid can enter the third reservoir 3 via an opening 21 in plate 7 and a inlet box 22. In order to improve the flow, a plate 23 can be placed in reservoir 2.

The third reservoir 3 is divided into a series of connected cells. In each of these cells, a mechanism 25 will be placed where very fine divided gas bubbles are induced in the bottom of the cells. These gas bubbles rise to the surface and separate additional materials. The material collects at the surface and creates a layer 26 which can be separated from the system via outlet gutters 28.

In the above description of the apparatus we speak about liquids such as water, polluted with oil and other substances. It is clear that with this system, other contaminated liquids can be treated according to the above invention. With this system, other means than gravity, separators, flotation, etc. can be used.

It is obvious that although, only one embodiment of an apparatus according to the invention is shown in the drawings and is described, the apparatus can be altered in many different ways without interfering with the invention.

What is claimed is:

1. An apparatus for the separation of at least one phase from a liquid, the apparatus comprising:

a substantially cylindrical first reservoir for primary separation of the phase from the liquid by means of gravity;

a second reservoir surrounding a part of the first reservoir and having at least one common wall with the first reservoir, the second reservoir providing additional separation of the phase from the liquid by at least one plate separator located therein;

a third reservoir surrounding a part of the first reservoir at a location above the second reservoir, and having at least one common wall with the first reservoir and at least one common wall with the second reservoir, the third reservoir providing additional separation of the phase from the liquid by introducing air into the liquid, and an entrance feeding a liquid containing said at least one phase to said first reservoir, a first passage feeding liquid still containing at least some of said at least one phase from said first reservoir to said second reservoir, and a second passage feeding liquid still containing at least some of said at least one phase from said second reservoir to said third reservoir.

2. An apparatus as claimed in claim 1, wherein said entrance comprises at least one inlet pipe for introducing liquid to the first reservoir, a longitudinal axis of the inlet pipe being tangential to a substantially cylindrical outer wall of the first reservoir.

3. An apparatus as claimed in claim 1, wherein said first passage comprises at least one outlet tube interconnecting the first reservoir and the second reservoir, the outlet tube being spaced a predetermined distance from a bottom wall of the first reservoir.

4. An apparatus as claimed in claim 3, wherein a plate separator is located at each of the outlet tubes.

* * * * *